United States Patent [19]

Wilkinson

[11] Patent Number: 4,606,047
[45] Date of Patent: Aug. 12, 1986

[54] HIGH FREQUENCY COMMUNICATIONS

[76] Inventor: Robert G. Wilkinson, 3 Edwards Close, Waterlooville, Portsmouth PO8 8RJ, Hampshire, United Kingdom

[21] Appl. No.: 432,939
[22] PCT Filed: Jan. 27, 1982
[86] PCT No.: PCT/GB82/00025
  § 371 Date: Sep. 28, 1982
  § 102(e) Date: Sep. 28, 1982
[87] PCT Pub. No.: WO82/02633
  PCT Pub. Date: Aug. 5, 1982

[30] Foreign Application Priority Data

Jan. 29, 1981 [GB] United Kingdom ............... 8102714

[51] Int. Cl.$^4$ .............................................. H04B 1/10
[52] U.S. Cl. ................................ 375/38; 375/102; 371/36
[58] Field of Search ........... 371/36, 68, 70, 38, 371/48; 375/38, 40, 100, 102; 340/825.62, 825.74; 455/137; 370/69, 70

[56] References Cited

U.S. PATENT DOCUMENTS

| | | | |
|---|---|---|---|
| 3,288,940 | 11/1966 | Bennett et al. | 340/825.74 |
| 3,499,108 | 3/1970 | Simon | 375/48 |
| 3,499,995 | 3/1970 | Clark | 375/45 |
| 3,526,837 | 9/1970 | Zegers et al. | 371/36 |
| 3,810,019 | 5/1974 | Miller | 375/38 |
| 3,895,223 | 7/1975 | Neuner et al. | 371/36 |
| 3,988,679 | 10/1976 | Clarke et al. | 375/102 |
| 4,223,185 | 9/1980 | Picou | 375/89 |
| 4,306,308 | 12/1981 | Nossen | 375/48 |

FOREIGN PATENT DOCUMENTS

| | | |
|---|---|---|
| 777416 | 6/1957 | United Kingdom . |
| 1027108 | 4/1966 | United Kingdom . |
| 1155633 | 6/1969 | United Kingdom . |
| 1416261 | 12/1975 | United Kingdom . |
| 1486235 | 9/1977 | United Kingdom . |

Primary Examiner—Benedict V. Safourek
Assistant Examiner—Stephen Chin

[57] ABSTRACT

A slow speed hf communication modem employs frequency and time diversity to overcome transmission problems due to noise, multipath etc. A digitally encoded signal is transmitted consecutively on five complementary 2-tone channels distributed within the hf band. A unique start-of-message (SOM) signal is generated (9) to precede a message transmission and an end-of-message signal (EOM) follows the message. The SOM signal is detected (18) to produce an accurate timing pulse (20) which initiates a clock in the receiver modem (3) arranged to sample each channel tone at times appropriate to receiving message signals. The noise in each channel tone is also sampled before (pre-data bit) and after (post-data bit) a signal data bit and the measured pre-and post-data bits are combined to assign a weighting factor to the associated message data bits. By providing SOM and EOM signals the modem is able to operate unattended.

12 Claims, 8 Drawing Figures

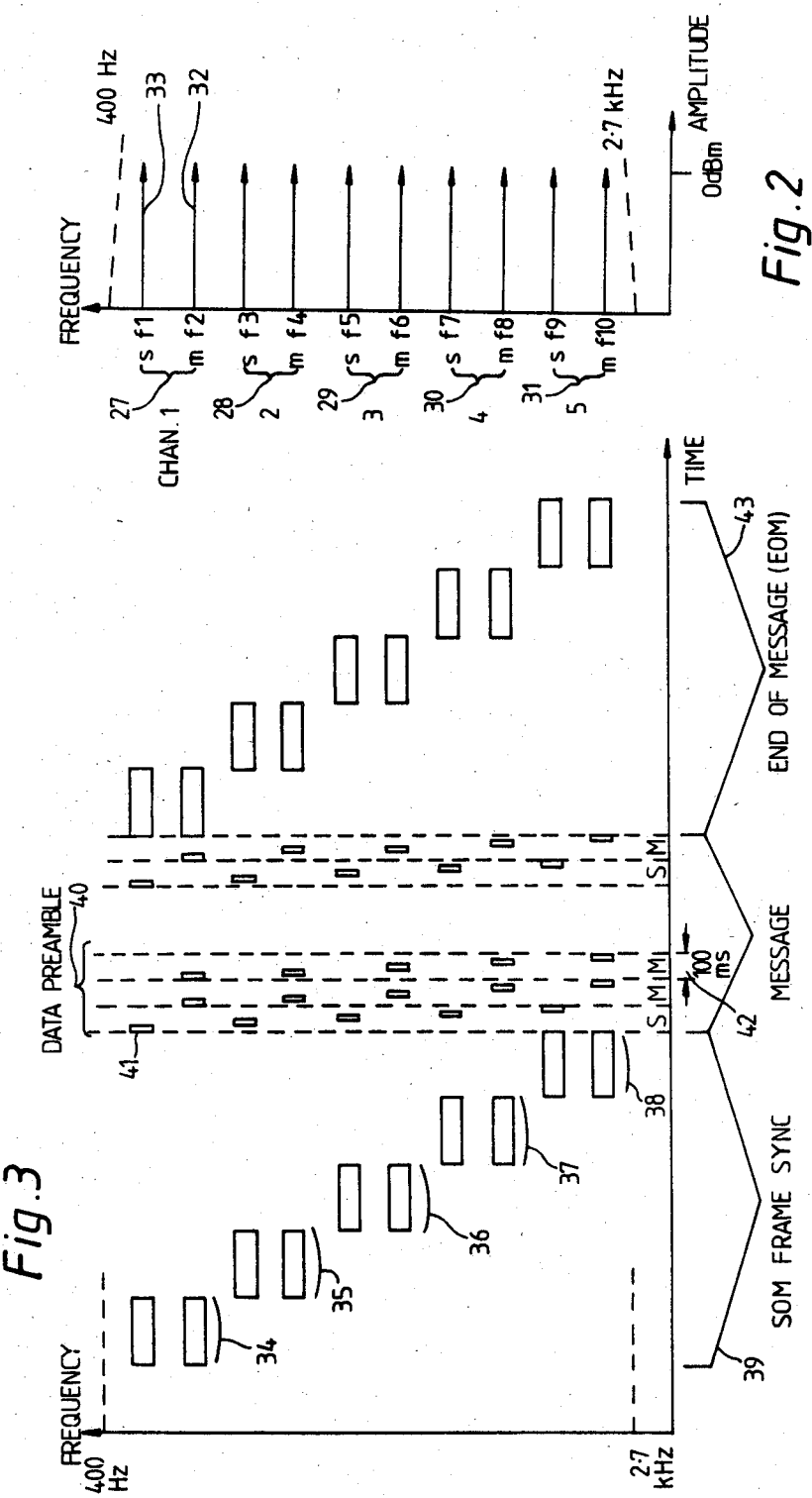

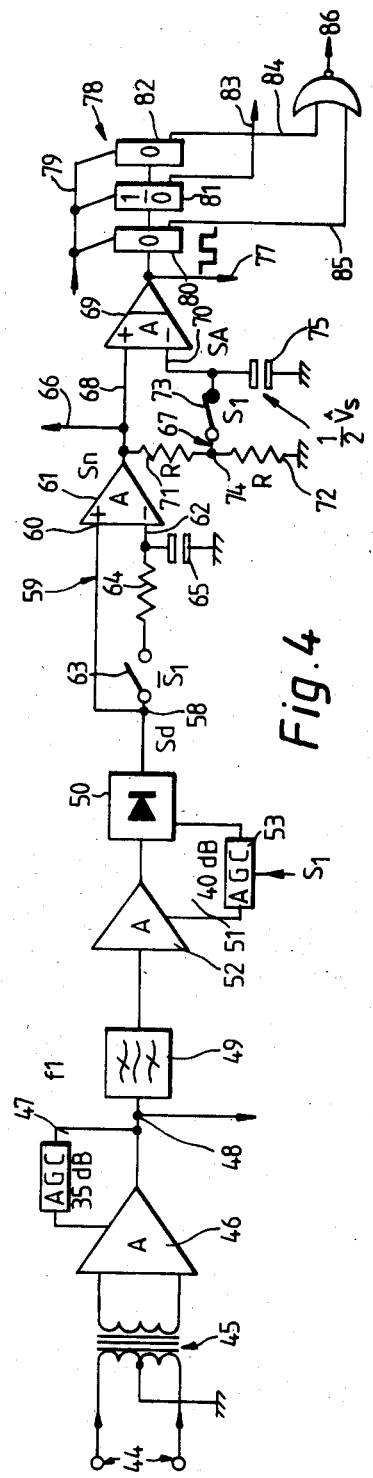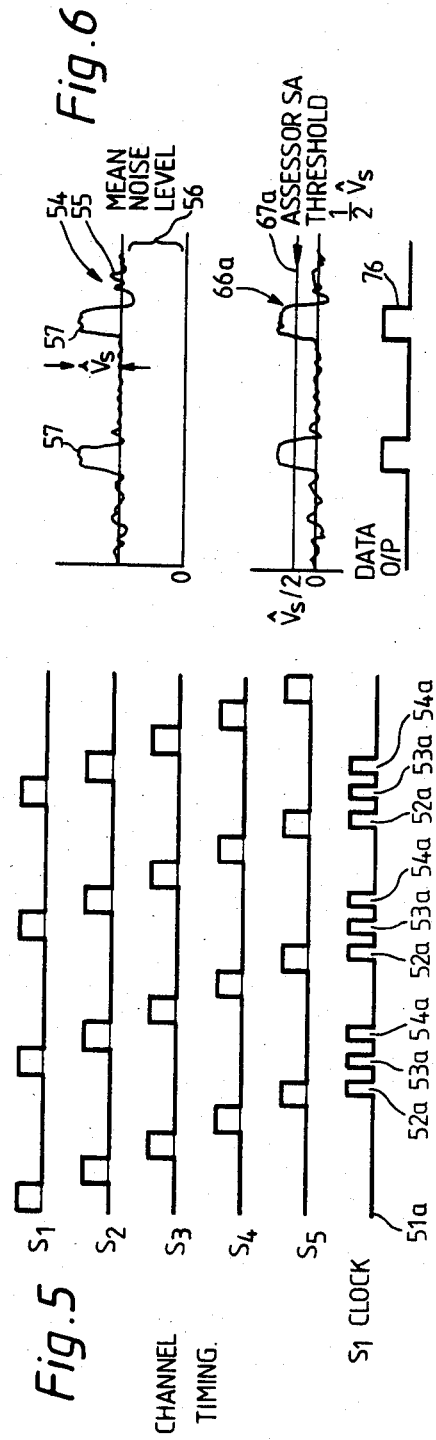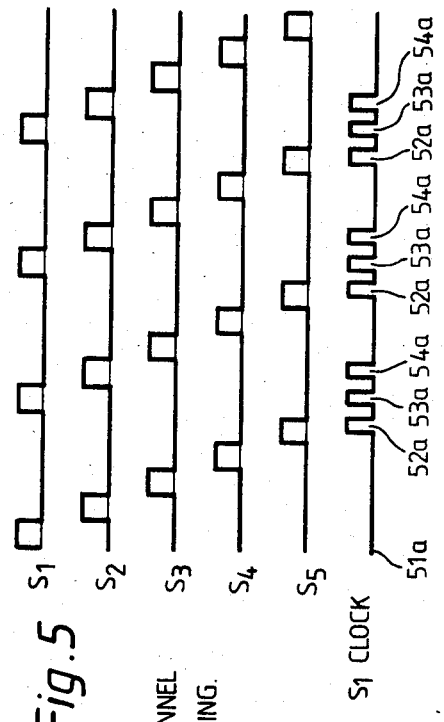

HIGH FREQUENCY COMMUNICATIONS

BACKGROUND OF THE INVENTION

The invention relates to radio communication within the high frequency band of 400 Hz to 2.7 KHz and in particular to modems for transmitting and receiving radio frequency signals.

High frequency (HF) communication performance can be degraded by three principle causes. Firstly propagation conditions can vary according to the time and frequency of transmission and also according to the geographical locations of the transmitter and receiver. Secondly, frequency selective fading and intersymbol interference can occur across the HF band because of ionospheric induced variations in multipath propagation. This arises as a result of ionospheric reflection by means of which high frequency transmission beyond the line-of-sight is achieved. More than one ionospheric reflective mode can exist and this causes multipath reception. Severe distortion can be observed on the transmitted data and in-band noise or interference which would normally be disregarded becomes the predominant factor during periods of signal fading. These conditions can only be completely avoided by frequency changing but this is usually impracticable. Undesirable effects of multipath propagation can be counteracted by employing appropriate signal processing before and after transmission. This is normally done using measurement of signal (spectral) spreading. The third cause of loss of performance is interference. Most of this encountered in the HF band is narrow band interference and can be avoided by changing the transmitting frequency. This is done by changing to an alternative channel frequency although where in-band frequency agility of the signalling tones can be used channel changing is not necessary. Wideband interference will always be a nuisance since it can only be avoided by frequency changing to a clear channel. When the wideband interference is impulsive, however, it can be avoided by adopting time dispersive coding into the transmitted signal format.

SUMMARY OF THE INVENTION

The object of the present invention is to provide a high frequency system which employs both frequency diversity and time diversity in order to counteract the adverse reception problems encountered in HF communications.

The invention provides a digital communications transmitter including message encoding means and means for transmitting each bit of an encoded message as a series of sequential signals on mutually differing frequency channels.

In another form the invention provides a receiver for receiving a digital communications message wherein each data bit of a message is transmitted as a series of sequential signals on mutually differing frequency channels, the receiver comprising a plurality of detectors each responsive to a respective frequency channel, means for scanning the detector outputs sequentially to identify individual signals and means to assign to each signal thus detected a weighting factor reflecting error probability and means to combine the weighted signals to reconstruct the communications message.

Advantageously each channel is two-tone, the first tone carrying the message and the second tone simultaneously carrying the complement of the message signal.

By this arrangement the transmitter transmits only one tone or frequency at a time during transmission of a message and the transmission is at a fixed rate. By consecutively transmitting the sequential signals the power output from the transmitter can be kept constant.

Preferably the transmitter includes circuit means to generate a uniquely coded Start-of-Message (SOM) signal and the receiver includes circuit means responsive to a received SOM signal to give an accurate timing signal for the scanning of the received signal. In an advantageous form the SOM signal is a 28 digit Barker-encoded signal.

In order to scan the detector outputs the receiver includes a clock which, on receiving the SOM timing signal, generates bit timing pulses so that each tone detector output can be sampled at appropriate time intervals for the data bits. In the preferred arrangement for assigning weighting functions to the detected data bits, clock timing signals are used to sample the noise signal in each tone detector output during time intervals before and after the data bit time intervals, each time interval thus sampled being labelled in dependence on whether the noise signal is above or below a predetermined threshold level. The samples thus obtained are hereinafter termed the pre-data bit and the post-data bit (check bits). In one embodiment the pre-data and post-data bits are combined and the weighting factor given to a data bit is zero if the combined pre-data and post-data bits include a noise signal. Using this arrangement the detected data bits from all the tone detectors with a non-zero weighting factor are combined using a simple majority, hereinafter called majority voting, to determine the best estimate for the information data bit. This method can, however, result in a good or uncorrupted detected data bit in one tone channel being ignored because one (or both) of the associated check bits is corrupt. In a second embodiment the weighting factor is derived from the square of the number of tones which are not corrupted by noise, as determined by the pre-data and post-data bit sampling, the detected data bit at each tone being multiplied by the weighting factor and the sum of the products compared to a pre-determined threshold such that an estimate of the information data bit is only accepted when the threshold level is exceeded. In a modification of the above best estimate method which assigns a weighting factor by looking at the pre-data and post-data bits for a single information data bit, use can be made of the temporal variation in the observed noise content by using check bits from a number of successive data bits to derive a weighting factor to be applied to the oldest data bit considered. After analysing all the receiver channels when the confidence in a received data bit is below a preselected threshold an error symbol can be inserted in the received message.

In one advantageous form the transmitter includes circuit means to generate a coded End-of-Message (EOM) signal and the receiver includes a detector responsive to the EOM signal so as to return the receiver to a standby condition. By this means automatic handling of received messages is facilitated.

Advantageously the invention provides a high frequency modem including a transmitter and a receiver. During transmission of a message the receiving circuitry can be connected to the transmitter output to check for transmission errors.

The invention also provides a method of high frequency communication involving the successive steps of:

1. digitally encoding a message;
2. transmitting each digit consecutively as a signal in a frequency channel distributed within the high frequency band;
3. detecting the transmitted signals;
4. scanning each frequency channel to detect noise,
5. assigning to each detected frequency signal a probability of error depending on the noise; and
6. combining the signals from each channel to reconstruct the transmitted message.

BRIEF DESCRIPTION OF THE DRAWINGS

The invention will now be described by way of example only with reference to the accompanying drawings of which:

FIG. 2 is a graph showing the locations in the HF band of the five 2-tone channels used by the transmitter/receiver;

FIG. 3 is a representation of a message format used by the transmitter/receiver;

FIG. 4 shows a single tone detection circuit in the receive modem of the transmitter/receiver;

FIG. 5 illustrates the timing sequences adopted in the modem of FIG. 4;

FIG. 6 illustrates graphically the processing of a received signal;

DESCRIPTION OF THE PREFERRED EMBODIMENT

Figure 1:
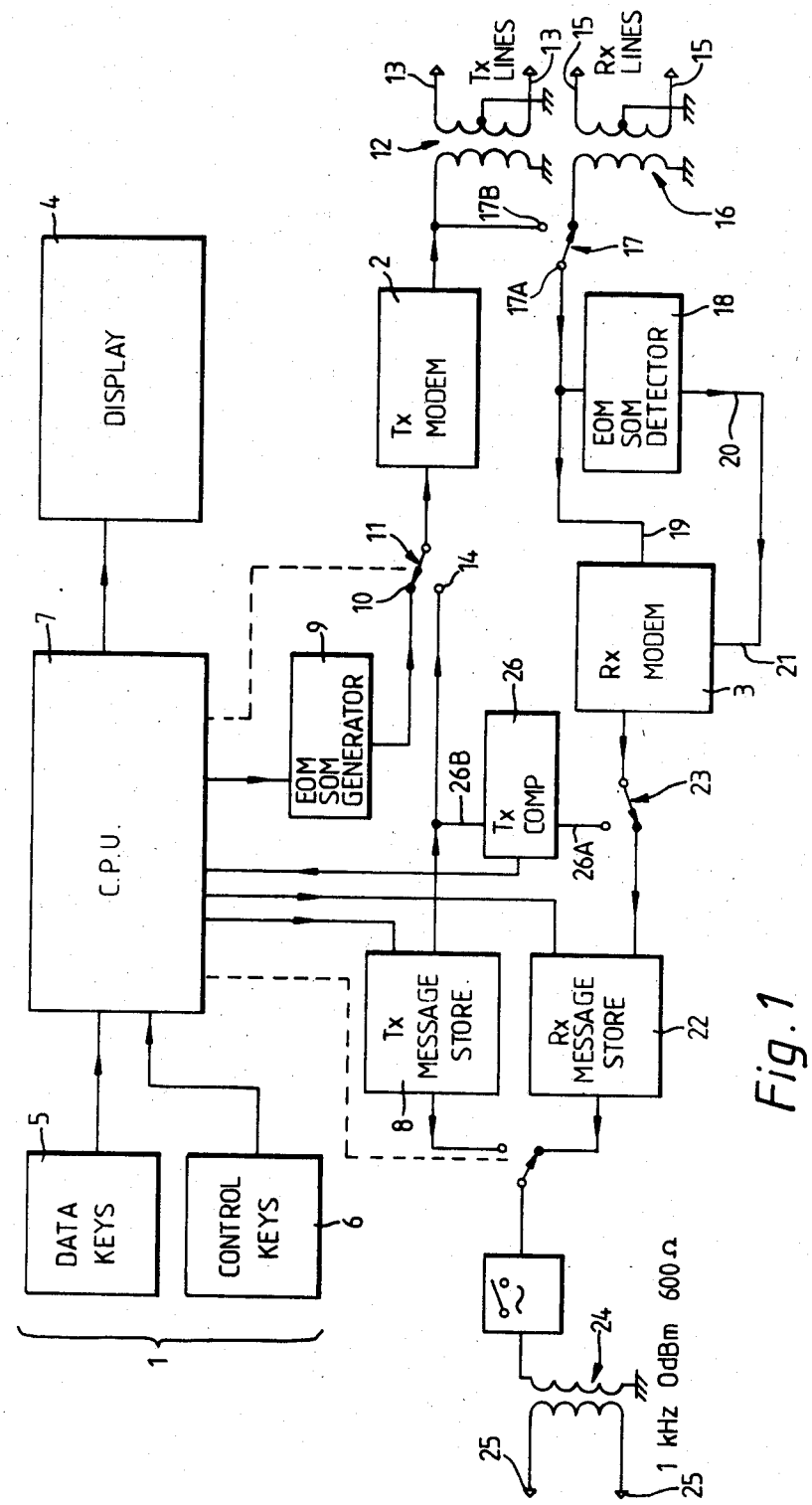
FIG. 1 is a block diagram representation of a high frequency transmitter/receiver according to the invention.

FIG. 1 shows a schematic block diagram of the high frequency communication system which includes a keyboard 1 for message generation and control, a transmission modem 2 for translation of messages into a transmission format, a receive modem 3 for decoding received messages and a visual display 4 for presentation of received messages and assistance in preparation of messages for transmission. The keyboard 1 consisting of data keys 5 and control keys 6 is connected to a central processing unit (CPU) 7 which controls the management of the complete system. A message for transmission is routed through the CPU 7 to a transmission message store 8. Also connected to the CPU 7 is an End-of-Message/Start-of-Message (EOM/SOM) generator 9. When transmission is required the CPU 7 initiates an SOM signal from the SOM generator 9 and this is connected through a first pole of a 2-pole switch 11 controlled by the CPU 7 to the transmission modem 2. The output from the transmission modem 2 is coupled by means of a centre-tapped transformer 12 to transmission lines 13. The output from the transmission message store 8 is connected to a second pole 14 of the switch 11. The CPU 7 controls the transmission of a message in such a way that the switch 11 first connects first pole 10 to the transmission modem 2 for an SOM signal, second pole 14 is then connected to the transmission modem 2 so that the message stored in the transmission message store 8 can be transferred to the transmission modem 2 and then finally the transmission modem 2 is reconnected to first pole 10 of the switch 11 for an EOM signal.

On reception of a transmitted message the received signal in the receive lines 15 is coupled by means of a centre-tapped transformer 16 through a first pole 17A of a 2-pole switch 17 to the input of an EOM/SOM detector 18 and a first input 19 of the receive modem 3. The EOM/SOM detector 18 responds to a received SOM signal by producing a timing signal at its output 20 which is connected to a second input 21 of the receive modem 3. The timing signal prompts the receive modem 3 into readiness to accept a message and synchronise the operation of the receive modem 3 to allow processing of the message to be done as will be described below. The processed message from the receive modem 3 is connected to a receive message store 22 through a 2-pole switch 23 for storage and also to the VDU display 4. When an appropriate control key is depressed the contents of the receive message store 22 may be read out via transformer 24 and lines 25 to a local copy output socket at 75 bauds.

In a preferred arrangement the communications system has an ON-LINE facility and in this mode the CPU 7 is programmed to automatically clear the VDU display 4 and to transmit an SOM sequence. The keyboard 1 is then connected ON-LINE to the radio transmission lines 13 and the VDU display 4. In this mode, adequate buffer storage (not shown) must be provided between the keyboard 1 and the transmit modem 2 to compensate for the data rate differential which will exist between them. The transmitted message is displayed on the VDU display 4 until an EOM has been transmitted, at which time the display is erased and the communications system is reverted to a standby condition in which a received message will be automatically stored in the receive message store 22 and displayed on the VDU display 4. When used in the normal transmit mode the receive lines 15 are automatically cross-connected to the transmission lines 13 via the second pole 17B of the switch 17 to provide an on-line self check facility. In this mode the receive signal is decoded by the receive modem 3 and by altering the connection of the 2-pole switch 23 the receive signal is disconnected from the receive message store 22 and the VDU display 4 and is conneccted to one input 26A to a transmission comparator circuit 26. The transmitted signal is connected to a second input 26B to the transmission comparator circuit 26. An error alarm lamp (not shown) is connected to the transmission comparator circuit 26 so as to indicate any transmitted bit errors which are detected.

FIGS. 2 and 3 show a diagrammatic representation of the signal format adopted by the transmit modem 2 for transmission of messages. Each data bit of a message is transmitted consecutively on five 2-tone amplitude shift keyed (ASK) modulated channels 27–31 comprising a total of 10 frequencies f1–f10 distributed through the HF band from 400 Hz to 2.7 kHz. The information transmission rate of the transmission modem 2 is at 10 bits/sec and with each channel arranged to produce a dedicated Mark (M) 32 or Space (S) tone 33 at frequencies f2 and f1 respectively in the first channel 27 for example where the S signal is the complement of the M signal, the transmission rate of each 2-tone channel 27–31 will be 50 bauds and only one signal tone will be activated at any one time. As seen in FIG. 3 a transmitted message begins with a unique SOM signal which is transmitted during the times 34–38 on the respective channels 27-31. The SOM signal is a 28 bit Barker encoded signal used for frame synchronisation to ensure correct channel and bit synchronisation in a modem receiving the signal. In the receive modem the SOM signal is detected using matched filter detectors on every M and S detector output to ensure that synchronisation will be achieved even when only one signal frequency is operational. The time interval 39 thus represents the total SOM frame synchronisation time. With a 50 baud data rate the SOM signal should provide a timing aquisition of better than ±10 millisecs.

After transmission of the SOM signal a coded data preamble 40 is transmitted. The data preamble is shown in FIG. 3 to consist of an S tone followed by two M tones with each S and M tone being transmitted consecutively in each of the five channels 27 to 31. At the 50 baud transmission rate of the modem each pulse 41 is 20 millisecs long and the time for each information bit 42 is 100 millisecs. The data preamble is transmitted to provide a stabilising period for the receive modem after frame synchronisation and before receiving a transmitted message. This is important where the receive modem includes signal threshold, timing and detector circuits whose circuit constants are determined by the received signal. A fixed preamble pattern such as that shown in FIG. 3 is used for this purpose because the constants of these circuits can then be appropriately set at the relevant times in the preamble. At the end of each message an End-of-Message (EOM) signal is transmitted during the time interval 43 on each of the consecutive 2-tone channels 27 to 31 by depressing an EOM key. In a convenient form the EOM signal can be the reverse of the SOM signal so that a single EOM/SOM generator 9 can be used (FIG. 1). The EOM message 43 simplifies message handling and control during reception and makes it possible for the modem to operate automatically in the receive mode and makes possible some degree of unattended operation.

In the receive modem a matched filter is provided for each tone and this produces an output signal when the uniquely coded SOM signal is received. Each of the 10 tones f1 to f10 then produces an outpt signal on receiving the SOM signal.

Once channel and bit synchronisation is completed the channel signals are demultiplexed and each 2-tone channel is threshold detected. The individual data bits thus detected are tested and labelled with a status condition dependent on the level of interference or noise present. FIG. 4 shows one circuit arrangement for processing the received signal with the circuitry for only one tone f1 shown for simplicity. The input 44 to the receive modem 3 is connected via a centre tapped transformer 45 to an amplifier 46 having an Automatic Gain Control (AGC) loop 47 such that the modem can operate with a nominal input level of 0 dB m in the frequency band of 400 Hz to 2.7 kHz. The output 48 from the amplifier 46 is connected to a respective band-pass filter 49 in each single tone circuit. The output from the filter 49 is connected to a tone detector 50 connected in a circuit 51 including an AGC-connected amplifier 52. Connected to the circuit 51 is a channel timing signal $S_1$ which provides a gating signal pulse corresponding in duration to the time during which information is transmitted on the first channel 27. Channel timing signals S1 and also S2 to S5 for the other transmission channels 28 to 31 are produced by a receive clock (not shown) according to the format shown in FIG. 5. Each channel timing pulse is 40 millisecs long and is repeated every 200 millisecs. The channel timing pulses S1 to S5 are therefore consecutive in time with S1 repeatedly following S5. Also shown is the output 51a from an S1 clock which periodically produces a group of three pulses 52a-54a of which the first pulse 52a occurs immediately before an S1 pulse, the second pulse 53a occurs during an S1 pulse and the third pulse 54a occurs just after an S1 pulse. The channel timing pulses S1 applied to an input 53 of the AGC circuit 51 such that the AGC operates preferentially during the S1 time intervals when the first tone f1 signal data is present. A typical signal Sd from the output of the tone detector 50 is shown as a voltage-time graph 54 in FIG. 6. The graph shows random noise fluctuations 55 about a mean noise level 56 with a signal 57 present having an amplitude $\hat{V}s$. The signal Sd is applied to the input 58 of a circuit 59 which subtracts the mean noise level 56 from the Sd signal 54. The signal Sd is applied to the non-inverting input 60 of a difference amplifier 61. Sd is also connected to the inverting input 62 of the difference amplifier 61 via a switch 63 and a resistor 64. The switch 63 has applied to it a timing signal $\overline{S1}$, the complement of S1, such that it is closed whenever there is no signal S1 and is open when a signal pulse S1 is present. Thus when there is no signal S1 the signal Sd applied to the inverting input 62 of the difference amplifier 61 charges an earthed capacitor 65 such that the voltage on the inverting input 62 corresponds to the voltage level 56 of the mean noise level. When a timing signal S1 is present the switch 63 opens and any signal data present in the signal Sd is applied to the non-inverting input 60 of the difference amplifier 61. The output Sn from the difference amplifier 61 is a signal 66a, shown in FIG. 6, in which the mean noise level is zero. The signal Sn is applied via a connection 66 to a frame synchronising circuit. The frame synchronising circuit is a matched filter circuit which is arranged to detect the SOM signal 39 and, on detection, to produce an accurate frame sync output signal which is used to initiate clock timing sequences in the receive modem.

The signal Sn is also applied to the input of an assessor threshold circuit 67 which amplifies the signal Sn when it exceeds a threshold 67a (FIG. 6) equal to $\frac{1}{2}\hat{V}_s$, where $\hat{V}_s$ is the peak signal above the mean noise level. The signal Sn is connected to the non-inverting input 68 of a second difference amplifier 69 and also to the inverting input 70 of the amplifier 69 via a voltage dividing resistor network 71, 72 and a switch 73. Resistors 71 and 72 are connected in series between earth and the output of the difference amplifier 61 and their interconnection point 74 is connected to the switch 73. By making the resistance valves equal, the signal applied through the switch 73 to the inverting input 70 of the difference amplifier 69 is Sn/2. A capacitor 75 is connected between earth and the inverting input 70 and the switch 73 has the S1 timing signal applied such that it is closed only during the S1 intervals thus when a signal of peak amplitude $\hat{V}_s$ is present in the signal Sn output of the amplifier 61 capacitor 75 charges up to a voltage of $\hat{V}_S/2$ and the amplifier 69 acts as threshold amplifier, amplifying signals in excess of $\hat{V}_S/2$. The output from the amplifier 69 appears as a date signal 76 (FIG. 6) in which the random noise fluctuations 55 are absent. The data signal 76 is is used as an input 77 to a bit timing circuit to keep the channel timing signals correctly synchronised and is also connected to a three stage shift register 78. The purpose of the three stage shift register 78 is to sample the threshold detected signal at the times S1 when data bits should be present and also to sample the signal during small time intervals immediately before and immediately after the S1 times. If there is no corruption of the input signal then these additional samples, hereinafter termed the pre-data bit and the post-data bit should have no signal present. In terms of digital logic the data bit may show either a logical "1" or a logical "0" and when there is no corruption of reception the pre-data and post-data bits should be a logical "0". Since no data is transmitted immediately before or after the data bit on any one tone the confidence in a detected data bit can be labelled by observation of the pre-data and post-data bits with two logical "0"s representing status good. Clock shift pulses for the shift register 78 are provided by the S1 clock through connections 79 to each stage 80–82 of the register 78. The timing of the S1 clock pulses 52–54 (FIG. 5) is so arranged that the output from the amplifier 69 is first sampled at the time determined by pulse 52 prior to the S1 channel timing interval where the sample should therefore be a "0". Timing pulse 53 during the S1 interval then samples the data signal and will therefore give a data "1" or a data "0". Timing pulse 54 occurring after the S1 interval then samples the output from amplifier 69 after the data signal interval. Thus after the S1 clock pulse 54 the shift register 78 will be filled with the pre-data bit in stage 82, the data bit in stage 81 and the post data bit in stage 80. The data signal is taken from the output 83 of the second stage 81 of the shift register 78. In the absence of noise or interference signals the pre-data bit in stage 82 and the post-data bit in stage 80 will both be "0". The outputs 84 and 85 from these respective stages are provided as inputs to a "NAND" gate. The output 86 from the "NAND" gate can then be used to qualify the status of the data bit with a "1" representing a good data bit and a "0" resulting from a "1" in either the pre or post-data bit (or both) representing a possibly corrupt data bit. If during a transmission of a tone high levels of interference or noise are present in the same signalling bandwidth the pre- or post-data bits will probably be corrupted by the same extent as the data bit. Each channel F1 to F10 is processed in the same way and therefore there are produced ten data outputs together with status conditions which can be processed by a best estimate decoder.

Figure 7:
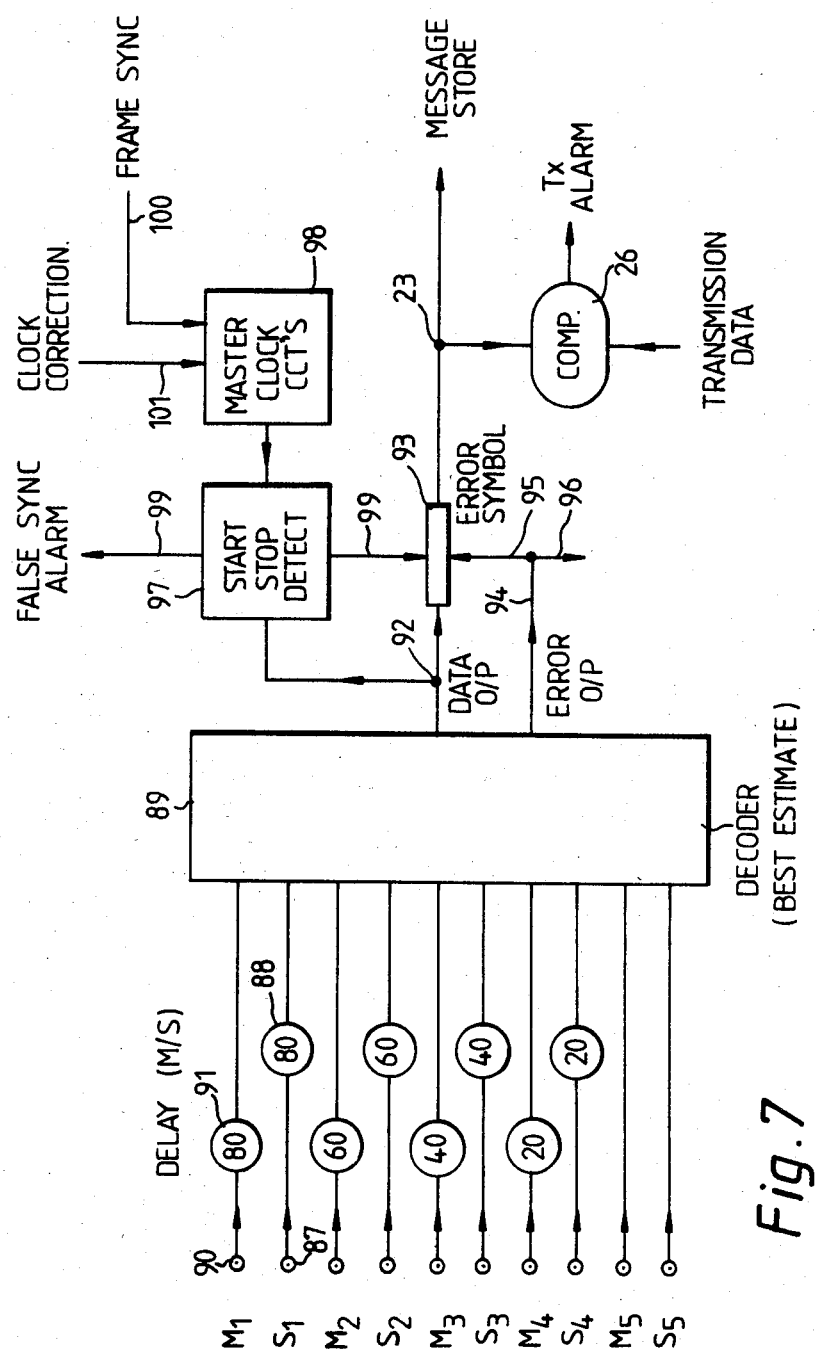
FIG. 7 shows a further part of the modem circuit used to obtain a best estimate from the five 2-tone channels.

FIG. 7 shows how the channel signals are combined for analysis by a best estimate decoder. The data output 83 from the f1 tone detector (S1) is connected to the input 87 of an 80 millisec delay 88 and thence to a best estimate decoder 89. The complementary output M1 from the first channel at the second tone frequency f2 is also connected to the input 90 of a second 80 millisec delay 91 before connection to the decoder 89. In a similar manner each M and S tone of the other four channels is connected to the decoder 89 via an appropriate delay such that all ten signals arrive simultaneously at the decoder. The second channel signals M2 and S2 are therefore delayed by 60 millisec, the third channel signals M3 and S3 by 40 millisec, the fourth channel signals M4 and S4 by 20 millisec and the fifth channel signals M5 and S5 are directly connected to the decoder 89. In addition to these ten tone signals ten respective status signals, as for example the output 86 from the F1 tone are also connected to the decoder 89. The best estimate decoder 89 is programmed with an algorithm whereby on receiving an information data bit on each of the five 2-tone channels only those tones are used which pass the pre- and post-data bit status check. A simple majority vote is then taken of the data bits to assign a "1" or a "0" to that information data bit. With these criteria for interpretation of a received signal the best estimate data is provided as an output 92 from the decoder 89 and is connected to a character store 93. The character store is able to store all the data bits corresponding to a message character i.e. possibly five bits. If there should be no reliable data bit as indicated by all tones having at least one pre- or post-data bit "1" then an error signal at an error output 94 from the decoder 89 causes an error symbol to be placed in the character store 93 via an input 95 and actuates an error indicator adjacent to the VDU display 4 of the transmitter/receiver via a connection 96. The output from the character store 93 is connected to the receive message store 22. The received character from the character store 93 can be connected as shown in the FIG. 1 arrangement via a switch 23 to a comparator 26 where it is compared with the transmitted character when the system is used in the transmit mode. Start and stop bits can be added to a transmitted message before and after each character so as to provide a means for error rate detection to give a further indication of the quality of the received message, to provide a means to indicate a false synchronisation and also to provide a means to indicate a circuit failure. A start/stop detector circuit 97 is connected to the data output 92 from the decoder 89. The start and stop signals detected thereby are compared with signals produced by master clock circuits 98. If the detected start or stop signals are out of synchronisation with the master clock a signal is produced at an output 99 connected to a false synchronisation alarm and the transmitter/receiver is automatically returned to a standby mode. The start/stop bits are regenerated by a connection 99 from the start/stop detector 97 to the character store 93 in order to prevent loss of character synchronisation during subsequent handling of the received message which might be caused by corruption of these elements. The timing of the master clock circuits is controlled by a frame synchronisation signal to input 100 and a clock correction signal to input 101 from bit timing circuits connected to the outputs from the tone amplifiers 69 in each signal tone detector circuit.

Figure 8:
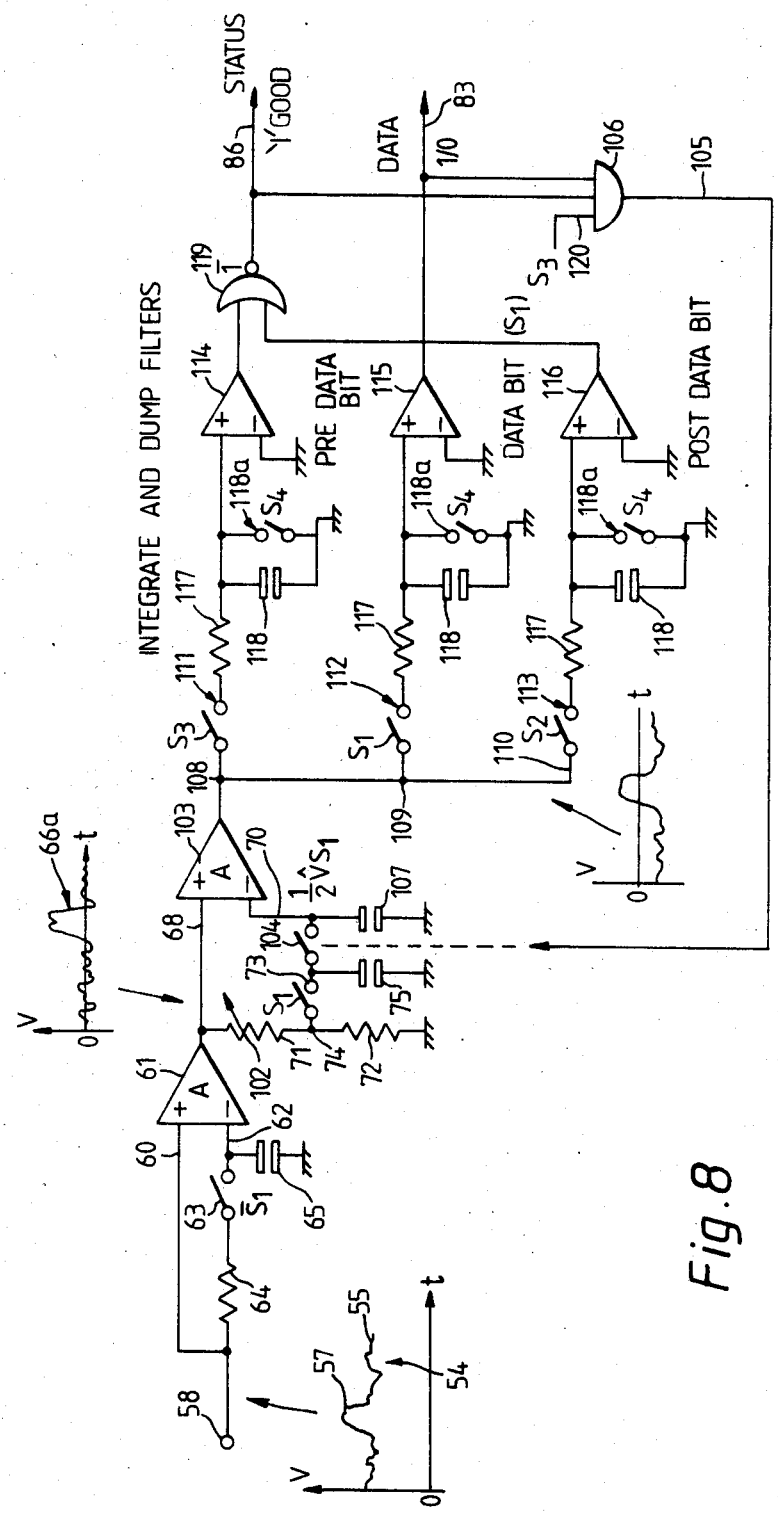
FIG. 8 is an alternative circuit arrangement to that shown in FIG. 4.

An alternative circuit arrangement to that shown in FIG. 4 for analysing the pre- and post-data bit time intervals in the signal outputs from each tone detector 50 is shown in FIG. 8 where like reference numerals are used to indicate like integers. The output signal 54 from the tone detector 50 is connected to the input 58 of a difference amplifier circuit which substracts the mean noise from the signal. As in the FIG. 4 arrangement the mean noise level signal is derived using the $\overline{S1}$ timing signal to charge the capacitor 65 connected to the inverting input 62 of the difference amplifier 61. The output signal 54 which includes the data bit 57 in the S1 time interval superimposed on the noise level signal 55 is applied directly to the non-inverting input 60 of the difference amplifier 61. The output signal 66a from the difference amplifier 61 is applied to an assessor threshold circuit 102 which is a modification of the circuit 67 shown in FIG. 4. The signal 66a is applied to the non-inverting input 68 of the difference amplifier 103 and a voltage of $\frac{1}{2}\hat{V}S1$ equal to half the peak voltage in signal 66a is applied to the inverting input 70 of the amplifier. The amplifier 103 therefore responds only when the voltage of the signal 66a exceeds $\frac{1}{2}\hat{V}S1$. As before the voltage dividing resistors 71 and 72 connected to the output of the amplifier 61 apply half the signal voltage to the capacitor 75 during the S1 time interval when the switch 73 is closed. In this arrangement however the voltage developed across the capacitor 75 is not applied directly to the inverting input 70 of the amplifier 103. The capacitor 75 voltage is connected to the inverting input 70 via a switch 104 only when a signal is applied from the output 105 of an "AND" gate 106 which is produced only when a data "1" is accompanied by a status signal "1" indicating that the data bit is unlikely to be corrupted. When the switch 104 is closed the voltage across capacitor 75 is applied across a second capacitor 107 connected to the inverting input 70 of the amplifier 103. The timing is arranged such that the capacitor 107 holds this voltage signal (equal to ½VS1) until a subsequent data "1" and status "1" occur.

The output signal from the amplifier 103 is connected to the inputs 108–110 of three similar integrate and dump filters. Input switches 111–113 opening respectively at times S5 immediately before the S1 data bit time interval, S1 and S2 immediately aftr the S1 time interval ensure that the pre-data bit, the data bit and the post-data bit are coupled to the respective non-inverting inputs of difference amplifiers 114–116. During the time that the appropriate switch 111–113 is closed the signal is applied to the non-inverting input of the amplifier by an integrating RC combination 117, 118. Subsequent to the sampling of the input signal in the three consecutive time intervals S5, S1 and S2 the capacitors 118 are short-circuited at time S4 by switches 118a dumping their charges to earth. The outputs from the pre-data bit amplifier 114 and the post-data bit amplifier 116 are connected to a "NOR" gate 119 to give a logical "1" if a "0" is present at the outputs of both amplifiers. The output from the "NOR" gate 119 provides the signal at the status output 86 and also is coupled to the "AND" gate 106 together with the data output 83 from amplifier 115. A A third input 120 is provided into the "AND" gate 106 and the timing signal S3 is applied to this input so that the switch 104 in the assessor reference threshold circuit 102 is connected only at time S3 when a data "1" and a status "1" are present.

The performance of the simple decoding algorithm described above is to be compared with a majority voting algorithm applied to all the received data bits, irrespective of the polarity of any pre- or post-data bits. In this latter majority vote decoder the ten data bits corresponding to one information bit are summed. If the number of binary "1" data bits is greater than five the output bit is made a binary "1" and if the number of binary "1" data bits is less than five then the output bit is made a binary "0". When the number of binary 1s and 0s is equal (ie five) the output bit can be made either 1 or 0 by a random selection provising there is an equal distribution of 1s and 0s in the original message. The measured performance of the sample pre- and post-data bit decoding algorithm is slightly worse than that for the Majority Vote Decoder because the number of data bits used for decoding will at times be far less than ten. An error in a pre or post data check bit will remove its associated data bit whether or not it is in error. When errors are statistically independent such that an error in a pre- or post-data bit is uncorrelated with an error in a data bit then the decoder performance is degraded relative to the majority vote decoder. When, however, there is a statistical dependence between data bits and their associated pre- and/or post-data check bits then the performance of the pre-, post-data bit decoder will be better than that of the majority vote decoder.

The invention described thus far has adopted a simple algorithm for interpretation of a detected signal by accepting only data whose pre- and post-data bits are not corrupted by noise or interference. An alternative approach to improve signal aquisition in a noisy environment is to apply a statistical weight to each data point, the weight taking into account the number of tones which register a particular data bit. Considering a data processor arrangement as shown in FIG. 7, every 100 millisecs during a message transmission one data bit and one status bit will be provided as an input from each tone detector into the decoder 89. The pre-data bit and post-data bit are added to produce a status number or status bit such that a "0" is produced when there is no error in the pre- or post-data bit i.e. status good, a "1" is produced if one bit (pre- or post-) is in error and a "2" is produced if both bits are in error. These numbers can then be incorporated into an algorithm to compute a weighting for each data bit and thence a best estimate.

A one second tranche of data is analysed by providing a 10-stage shift register at the input of each tone and status bit in the decoder 89. This tranch will thus include ten data bits and status bits successively received by each of the ten tone detectors at times $t_1$ to $t_{10}$. A recursive algorithm has been chosen to compute a statistical weight $W_t^F$ to be applied to the data bit at time $t=t$, for each of the ten tones F.

If $C_t^F$ is the status bit for tone F at time t then the statistical weight $W_t^F$ is given by:

$$W_t^F = \left(10 - \sum_{t=1}^{10} C_t^F\right)^2 \text{ for } \sum_{t=1}^{10} C_t^F \leq 9$$

and $$W_t^F = 0 \text{ for } \sum_{t=1}^{10} C_t^F > 9$$

A data vector $D_t^F$ is assigned to each data bit according to the following:

In the M channels where a data 1 represents an information 1:

$$D_t^F(M) = +1 \text{ for data 1}$$
$$= -1 \text{ for data 0}$$

and

In the complementary S channels where a data 0 represents an information 1:

$$D_t^F(S) = -1 \text{ for data 1}$$
$$= +1 \text{ for data 0}$$

Each data vector $D_t^F$ is then multiplied by the appropriate statistical weight $W_t^F$ and the products summed to give:

$$D_t = \sum_{F=1}^{10} (D_t^F \cdot W_t^F)$$

The sign of the resulting number is used to give an estimate of the information data bit. A total of +1000 will result from a "1" information data bit in the M tone of each channel with no data corruption i.e. each status bit being a "0" and a total of −1000 will result under the same transmission conditions if the information data bit is a "0". Confidence in the estimate of the information data bit will therefore be 100% if the products total is +1000 or −1000 and will reduce to zero for a products total of zero. It is then necessary by trial in a noisy environment while retaining acceptable reception to assign a minimum threshold for the modulus of this product sum such that the decoder will accept an estimate above this threshold and reject an estimate below it. Thus in the former case a best estimate data bit is produced at the data output 92 and in the latter case there is an error signal produced at the error output 94.

The discontinuity in the weighting function is introduced to improve the performance of the modem when operating with in-band interferers. Thus when the number of pre- or post-data check bits in one tone band F is equal to 10 or more then the statistical weight $W_rF$ is set to zero and that channel is ignored.

Analytically it has been shown that with a statistically random bit error rate (BER) applied to all ten tone channels the modem has a performance only marginally worse than a 10-channel majority voting decoder but slightly better than the simple pre-/post-data bit decoder. When the BER is random (50%) to a number (<10) of the tone channels the performance is considerably better than the other two decoders while with 50% BER to nine channels the performance of the decoder almost matches that of a single channel response under ideal conditions. Thus by applying the recursive decoding algorithm to the detected signals and pre-/post-data check bits the modem has demonstrated the ability to obtain the optimum detectable output even when the input to the receiving tone channels is severely corrupted by noise.

By adopting time and frequency diversity in the modem a further advantage results in that the maximum transmission power is available at each tone transmitted thereby assuring greater range and greater noise rejection capability than systems which employ simultaneous transmission of two or more tones. A set of unique supervisory signals is preferably provided which will be usable during either the on-line or normal working modes. Any one of the supervisory signals could then be called up at any time using pre-declared code words. The supervisory signal could, for example, instruct the receiving modem that the message transmission is to be repeated five times (say). When thus operated in the normal transmission mode the transmission can be automatically sent from the transmission message store to the appropriate number of times and the receive modem can interpret the supervisory signal to prepare for the repeated message. When repeated messages are received they can be stored and compared and further assessments made on the received characters to further reduce the possibility of error.

I claim:

1. A digital communications apparatus for receiving a digitally encoded message wherein each data bit of the encoded message is transmitted as a series of sequential signals in differing frequency channels, characterised in that the apparatus comprises:

a plurality of detectors each responsive to a respective frequency channel, means for scanning each detector output sequentially to identify individual signals, means to sample each detector output in the bit interval before (pre-data) and in the bit interval after (post-data) the appropriate message bit time interval, comparing means for comparing the samples with a predetermined threshold level to determine a weighting factor dependent upon noise associated with the appropriate intervening message bit time interval, means to take the product of the signal in the intervening message bit time interval with the associated noise weighting factor to give a weighted signal, and means to combine the weighted signals from the differing channels to reconstruct the message.

2. A digital communications apparatus comprising:

a transmitter and receiver wherein the transmitter includes message encoding means and means for transmitting each bit of the encoded message characterised in that the transmitter includes means for transmitting each bit as a series of sequential signals in different frequency channels distributed in the high frequency band, and the receiver comprises a plurality of detectors each responsive to a respective frequency channel, means for scanning each detector output sequentially to identify individual signals, means to sample each detector output in the bit interval before (pre-data) and in the bit interval after (post-data) the appropriate message bit time interval, comparing means for comparing the samples with a predetermined threshold level to determine a weighting factor dependent upon noise associated with the appropriate intervening message bit time interval, means to take the product of the signal in the intervening message bit time interval with the associated noise weighting factor to give a weighted signal, and means to combine the weighted signals from the differing channels to reconstruct the message.

3. A digital communications apparatus according to claim 1 further comprising:

summing means connected to the output of the channel sampling means to produce a first noise status number for each associated data bit in each channel, the status number being set to 0, 1 or 2 in dependence on the number of noise samples detected in the pre-data and post-data intervals;

storage means to store a number of successive data bits and associated status number from each channel;

computing means to combine the status number for a number of successive message data bits with the first status number to provide a first, weighting factor for the first message bit; and means to take the product of the first weighting factor and the first message bit and to add the products for each channel to determine the first message bit.

4. A digital communications apparatus according to any one of claims 1 or 2 characterised in that each channel is two-tone with the first tone carrying the message signal and the second tone simultaneously carrying the complement of the message signal.

5. Signal digital communications appatatus according to claim 4 characterised in that each receiver channel further includes a detector responsive to the respective second tone.

6. A digital communications apparatus according to claim 5 characterised in that the transmitter includes circuit means to generate a uniquely coded Start-of- Message (SOM) signal and the receiver includes circuit means responsive to a received SOM signal to give an accurate timing signal for scanning of the received signals.

7. A digital communications apparatus according to claim 6 characterised in that the receiver includes a clock which, on receiving the SOM timing signal, generates bit timing pulses at the same bit intervals as the received signals, so that the output from each detector can be sampled during appropriate time intervals for message bits.

8. A digital communications apparatus according to claim 4 characterised in that the transmitter includes means to generate a uniquely coded End-of-Message (EOM) signal and the receiver includes detector means responsive to an EOM signal so as to return the receiver to a standby condition.

9. A digital communications apparatus according to claim 8 characterised in that the outputs from the detectors sampled during the time intervals appropriate to a single message bit are combined using only the channel tones having no detectable noise in the pre-data and post-data bit intervals and majority voting is adopted to determine the message bit.

10. A digital communications apparatus according to claim 1 characterised in that all the channels sampled during the time intervals appropriate to a single message bit are combined adopting majority voting to determine the message bit, and further including: computing means to derive a weighting function from the square of the number of channel tones which have no detectable noise in the pre-data and post-data bit intervals, and comparator means to compare the output from the computing means to a pre-determined threshold to determine acceptance of the message bit.

11. A digital communications apparatus accordingly to claim 3 characterised in that each received tone message bit and associated status bit for each tone are connected to the inputs of a delay circuit arranged such that the message bits and status bits for each channel tone are simultaneously connected to separate shift registers, the status bits from each stage of a status bit shift register being combined to give the weighting factor for the first message bit in the associated message bit register.

12. A digital communications apparatus according to any one of claims 5 to 7 and 9, 10, and 3 characterised in that the transmitter includes means to generate a uniquely coded End-of-Message (EOM) signal and the receiver includes detector means responsive to an EOM signal so as to return the receiver to a standby condition.

* * * * *